US011247661B2

(12) United States Patent
Miwa et al.

(10) Patent No.: US 11,247,661 B2
(45) Date of Patent: Feb. 15, 2022

(54) CONTROL DEVICE AND CONTROL METHOD FOR HYBRID VEHICLE

(71) Applicant: TOYOTA JIDOSHA KABUSHIKI KAISHA, Toyota (JP)

(72) Inventors: Koji Miwa, Sunto-gun (JP); Takayoshi Kawai, Susono (JP); Kunihiko Usui, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 16/750,051

(22) Filed: Jan. 23, 2020

(65) Prior Publication Data

US 2020/0247391 A1   Aug. 6, 2020

(30) Foreign Application Priority Data

Feb. 5, 2019   (JP) .............................. JP2019-018486

(51) Int. Cl.
*B60W 20/16* (2016.01)
*B60W 10/06* (2006.01)
*F02D 41/02* (2006.01)

(52) U.S. Cl.
CPC ............ *B60W 20/16* (2016.01); *B60W 10/06* (2013.01); *F02D 41/0235* (2013.01); *B60W 2510/068* (2013.01); *B60W 2710/0666* (2013.01); *B60W 2710/083* (2013.01); *F02D 2041/0265* (2013.01); *F02D 2200/0802* (2013.01); *F02D 2250/24* (2013.01)

(58) Field of Classification Search
CPC .... B60W 20/16; B60W 10/06; F02D 41/0235
See application file for complete search history.

(56) References Cited

U.S. PATENT DOCUMENTS

| 2010/0204864 | A1* | 8/2010 | Ando | B60W 10/06 701/22 |
| 2011/0047980 | A1* | 3/2011 | Santoso | B60K 6/48 60/285 |
| 2014/0297088 | A1* | 10/2014 | Ando | B60W 20/17 701/22 |
| 2018/0030908 | A1* | 2/2018 | Pursifull | B60K 6/48 |

FOREIGN PATENT DOCUMENTS

JP   09-331603 A   12/1997

* cited by examiner

*Primary Examiner* — Derek D Knight
(74) *Attorney, Agent, or Firm* — Oblon, McClelland, Maier & Neustadt, L.L.P.

(57) ABSTRACT

It is provided a control device for a hybrid vehicle including a controller configured to control an engine, a first motor, and an automatic transmission and a control method of the hybrid vehicle. The controller is configured to determine whether or not an operation state of the engine is changeable, when an upshift of the hybrid vehicle is performed, decrease torque of an input shaft of the automatic transmission by outputting negative torque acting to decrease the torque of the input shaft of the automatic transmission from the first motor when a prohibition condition that the operation state of the engine is not changeable is established, and decrease engine torque output from the engine to decrease the torque of the input shaft of the automatic transmission to be decreased accompanied by the upshift when the prohibition condition is not established and the operation state of the engine is changeable.

7 Claims, 10 Drawing Sheets

CONTROL DEVICE AND CONTROL METHOD FOR HYBRID VEHICLE

CROSS-REFERENCE TO RELATED APPLICATIONS

This application claims priority to Japanese Patent Application No. 2019-018486 filed on Feb. 5, 2019 incorporated herein by reference in its entirety.

BACKGROUND

1. Technical Field

The present disclosure relates to a control device and a control method for a hybrid vehicle including an engine and a motor having an electric power generation function as a drive power source.

2. Description of Related Art

An example of this kind of hybrid vehicle is described in Japanese Unexamined Patent Application Publication No. 9-331603 (JP 9-331603 A). The hybrid vehicle includes an engine and a motor generator (hereinafter, simply referred to as a motor) having an electric power generation function as a drive power source, and the motor is coupled to an output shaft of the engine through a planetary gear mechanism. The engine is coupled to a ring gear of the planetary gear mechanism, the motor is coupled to a sun gear, and an automatic transmission is coupled to a carrier. Then, for example, gear shift shock in a case where the automatic transmission performs an upshift is absorbed or suppressed by increasing or decreasing motor torque output from the motor.

SUMMARY

Incidentally, in a general vehicle of the related art that includes solely an engine as a drive power source and has a transmission provided on an output side of the engine, in an upshift, an ignition timing of the engine is retarded (hereinafter, simply referred to ignition retard) to decrease engine torque, thereby decreasing an input rotation speed of the transmission. In a case where the ignition retard is executed, combustion of an air-fuel mixture is performed on an exhaust stroke side, and thus, high-temperature combustion exhaust gas is supplied to an exhaust gas control catalyst that removes combustion exhaust gas discharged from the engine. For this reason, in a case where the temperature of the exhaust gas control catalyst is lower than an activation temperature, the ignition retard is executed, whereby it is possible to warm up the exhaust gas control catalyst. In contrast, in a case where the ignition retard is constantly executed in the upshift, since high-temperature combustion exhaust gas is supplied to the exhaust gas control catalyst, the temperature of the exhaust gas control catalyst becomes excessively high, and inconvenience that catalyst activity is degraded or durability is degraded is considered.

In a hybrid vehicle including an engine and a motor as a drive power source, as input torque control to a transmission in a gear shift, such as an upshift, control using the motor and control without using the motor can be executed; however, since the device described in JP 9-331603 A described above is configured to execute torque control with the motor evenly in the upshift, there is a possibility that it is not possible to contribute to improvement of characteristics requested for a vehicle, such as improvement of fuel efficiency accompanied by promotion of warming-up or maintenance of durability of the exhaust gas control catalyst.

The disclosure provides a control device and a control method for a hybrid vehicle capable of decreasing an input shaft rotation speed of a transmission and suppressing gear shift shock with appropriate means according to a state of the hybrid vehicle in an upshift.

A first aspect of the disclosure relates to a control device for a hybrid vehicle. The hybrid vehicle includes an engine, an exhaust gas control catalyst, an automatic transmission, and a first motor. The exhaust gas control catalyst is configured to remove combustion exhaust gas discharged from the engine. The automatic transmission is arranged on an output side of the engine. The first motor is configured to have an electric power generation function of increasing or decreasing torque input from the engine to the automatic transmission. The control device includes a controller configured to control the engine, the first motor, and the automatic transmission. The controller is configured to: determine whether or not an operation state of the engine is changeable when an upshift of the hybrid vehicle to set a gear ratio smaller than a gear ratio currently set in the automatic transmission is performed; decrease torque of an input shaft of the automatic transmission to be decreased accompanied by the upshift by outputting negative torque acting to decrease the torque of the input shaft of the automatic transmission from the first motor when a prohibition condition that the operation state of the engine is not changeable is established; and decrease engine torque output from the engine to decrease the torque of the input shaft of the automatic transmission to be decreased accompanied by the upshift when the prohibition condition is not established and the operation state of the engine is changeable.

In the above-described first aspect, the prohibition condition may be at least one of a condition that a request for autodiagnosis of the engine is issued, a condition that the exhaust gas control catalyst is not in a predetermined state, and a condition that a request to maintain the engine torque is issued.

In the above-described aspect, the exhaust gas control catalyst may be a three-way exhaust gas control catalyst configured to an ability to store oxygen. The predetermined state of the exhaust gas control catalyst may be at least one of a state in which a temperature of the exhaust gas control catalyst is lower than a predetermined upper limit temperature, a state in which a request to retard an ignition timing of the engine is issued, and a state in which a request to stop supply of fuel to the engine is issued.

In the above-described first aspect, changing of the operation state of the engine may be performed by any one of retarding an ignition timing of the engine and stopping supply of fuel to the engine.

In the above-described first aspect, the hybrid vehicle may further include a first drive wheel to which torque is transmitted from the engine, a second drive wheel to which torque is not transmitted from the engine, and a second motor coupled to the second drive wheel to transmit torque and configured to have an electric power generation function. The controller may be configured to output the negative torque from the first motor to supply generated electric power to the second motor and to drive the second motor such that the second motor consumes the generated electric power, when the prohibition condition that the operation state of the engine is not changeable is established, and the negative torque is output from the first motor to decrease the torque of the input shaft of the automatic transmission for the upshift.

A second aspect of the disclosure relates to a control method for a hybrid vehicle including an engine, an exhaust gas control catalyst, an automatic transmission, and a first motor. The exhaust gas control catalyst is configured to remove combustion exhaust gas discharged from the engine. The automatic transmission is arranged on an output side of the engine. The first motor is configured to have an electric power generation function of increasing or decreasing torque input from the engine to the automatic transmission. The control method includes: determining whether or not an operation state of the engine is changeable when an upshift of the hybrid vehicle to set a gear ratio smaller than a gear ratio currently set in the automatic transmission is performed; decreasing torque of an input shaft of the automatic transmission to be decreased accompanied by the upshift by outputting negative torque acting to decrease the torque of the input shaft of the automatic transmission from the first motor when a prohibition condition that the operation state of the engine is not changeable is established; and decreasing engine torque output from the engine to decrease the torque of the input shaft of the automatic transmission to be decreased accompanied by the upshift when the prohibition condition is not established and the operation state of the engine is changeable.

In the control method of the above-described second aspect, the prohibition condition may be at least one of a condition that a request for autodiagnosis of the engine is issued, a condition that the exhaust gas control catalyst is not in a predetermined state, and a condition that a request to maintain the engine torque is issued.

According to the aspects of the disclosure, when the upshift to make the gear ratio set in the automatic transmission smaller is performed, and when the prohibition condition is not established and the operation state of the engine is changeable, the engine torque output from the engine is decreased to decrease the torque of the input shaft of the automatic transmission to be decreased accompanied by the upshift. Specifically, for example, when the temperature of the exhaust gas control catalyst is low and warming-up is needed, there may be no restrictions on execution of ignition retard. In such a case, the ignition retard is executed. With this, it is possible to supply high-temperature combustion exhaust gas to the exhaust gas control catalyst to warm up the exhaust gas control catalyst while decreasing the engine torque. When the prohibition condition is established and the operation state of the engine is not changeable, the torque of the input shaft of the automatic transmission to be decreased accompanied by the upshift is decreased by the negative torque output from the first motor. Specifically, for example, the temperature of the exhaust gas control catalyst may be equal to or higher than the upper limit temperature. In this case, in order to decrease the engine torque, the torque of the input shaft is decreased by the first motor, instead of executing the ignition retard or fuel cut-off control for stopping supply of fuel to the engine. With this, it is possible to suppress deterioration of the exhaust gas control catalyst due to overheating. In this way, according to the aspects of the disclosure, it is possible to select appropriate means and appropriately decrease the torque of the input shaft of the automatic transmission to be decreased accompanied by the upshift according to the state of the hybrid vehicle to suppress shock accompanied by a gear shift or delay of the gear shift.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
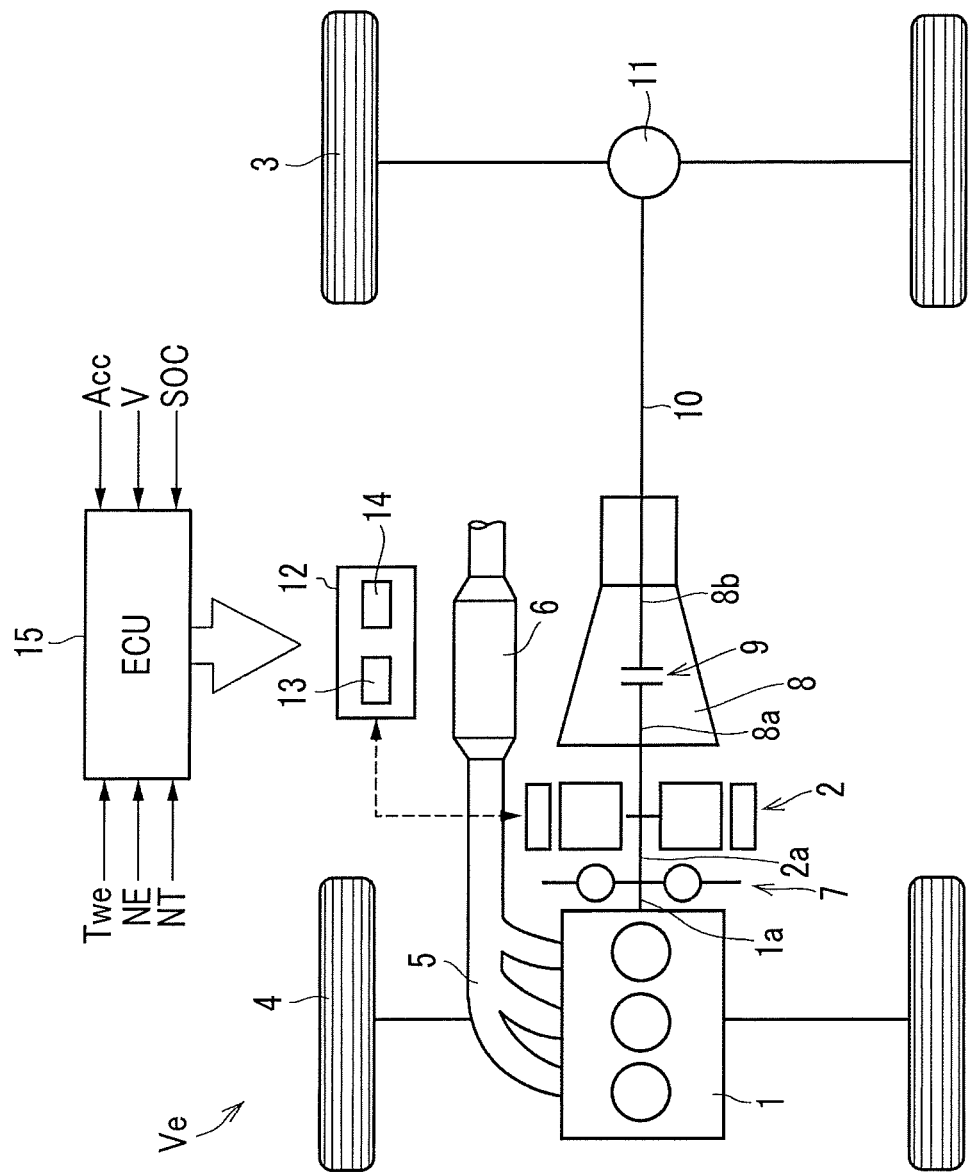
FIG. 1 is a diagram schematically showing a first example of a hybrid vehicle to which a control device for a vehicle according to an embodiment of the disclosure can be applied.

FIG. 1 is a diagram schematically showing a first example of a hybrid vehicle to which a control device for a vehicle according to an embodiment of the disclosure can be applied. A hybrid vehicle Ve shown in FIG. 1 has an engine 1 and at least one motor generator (hereinafter, referred to as a first motor) 2 as a drive power source. The hybrid vehicle Ve is a so-called front engine-rear drive (FR) vehicle in which the engine 1 is arranged on a front side of the hybrid vehicle Ve in a front-rear direction, and power of the engine 1 is transmitted to rear wheels 3. The engine 1 is arranged toward the rear wheels 3 (backward) between the right and left front wheels 4 (in a substantially center portion of a vehicle body (not shown) in a width direction) on the front wheels 4 side. The rear wheels 3 described above are an example of a first drive wheel in the embodiment of the disclosure. The front wheels 4 are an example of a second drive wheel in the embodiment of the disclosure.

The engine 1 is, for example, an internal combustion engine in which an air-fuel mixture of fuel and air is combusted to generate power, such as a gasoline engine or a diesel engine, and is configured such that output adjustment and an operation state, such as start and stop, are electrically controlled. In a case of a gasoline engine, an opening degree of a throttle valve, a supply amount or an injection amount of fuel, supply and stop of fuel, execution and stop of ignition, an ignition timing, and the like are electrically controlled. In a case of a diesel engine, an injection amount of fuel, supply stop of fuel, an injection timing of fuel, an opening degree of a throttle valve in an exhaust gas recirculation [EGR] system, and the like are electrically controlled.

The engine 1 includes an exhaust duct 5 that is provided to discharge combustion exhaust gas of the air-fuel mixture. Similarly to an exhaust duct in an engine for an automobile known in the related art, the exhaust duct 5 includes an exhaust manifold that communicates with a cylinder of the engine 1, and an exhaust pipe that communicates with the exhaust manifold. In the example shown in FIG. 1, the exhaust duct 5 is configured to discharge combustion exhaust gas rearward of the vehicle body. An exhaust gas control catalyst 6 is provided in the middle of the exhaust duct 5. Similarly to a three-way exhaust gas control catalyst in the engine for an automobile known in the related art, exhaust gas control catalyst 6 is a device that oxidizes hydrocarbon (HC) or carbon monoxide (CO) in combustion exhaust gas discharged from the engine 1 to decrease the concentration of hydrocarbon (HC) or carbon monoxide (CO) and reduces nitrogen oxide to decrease the concentration of the nitrogen oxide, and is a device that is requested for temperature increase to a predetermined activation temperature. The upper limit temperature is determined in order to avoid damage due to overheating or degradation of durability.

The first motor 2 is an example of a first motor in the embodiment of the disclosure. The first motor 2 is arranged coaxially with the engine 1 and is coupled to an output shaft 1a of the engine 1. The first motor 2 has a function as a power generator that is driven with reception of engine torque output from the engine 1 to generate electric power, and a function as a motor that is driven with supply of electric power to output first motor torque. The first motor 2 is constituted of, for example, a permanent magnet type synchronous motor, an induction motor, or the like. As described below, an electric power storage device 13, such as a battery, is connected to the first motor 2 through an inverter 14. Accordingly, it is possible to drive the first motor 2 as a power generator, and to store thus-generated electric power in the electric power storage device 13. Furthermore, it is possible to supply electric power stored in the electric power storage device 13 to the first motor 2, and to drive the first motor 2 as a motor. A rotational shaft 2a of the first motor 2 is coupled to the output shaft 1a of the engine 1 through a damper device 7 that reduces vibration of the engine torque output from the engine 1 and transmits the engine torque.

On an output side of the first motor 2, an automatic transmission 8 is arranged on the same axis as the engine 1 and the first motor 2. The automatic transmission 8 is a mechanism that can appropriately change a ratio of an input shaft rotation speed NT of an input shaft 8a to an output rotation speed of an output shaft 8b, and can be constituted of a stepped automatic transmission that can change a gear ratio in a stepwise manner, a continuously variable transmission that can continuously change a gear ratio, or the like. Next, a case where the automatic transmission 8 is a stepped automatic transmission will be described as an example. In a case where the first motor 2 is coupled directly to the output shaft 1a of the engine 1 or the input shaft 8a of the automatic transmission 8, the rotational shaft 2a of the first motor 2 may be fitted directly to the output shaft 1a of the engine 1 or the input shaft 8a of the automatic transmission 8 to be integrated.

The automatic transmission 8 shown in FIG. 1 includes a clutch mechanism 9 that can transmit torque at the time of engagement and can cut off transmission of torque at the time of release to set a neutral state. As the clutch mechanism 9, a friction type clutch mechanism that can continuously change a transmission torque capacity can be employed. Accordingly, in a case where the engine torque of the engine 1 or the first motor torque output from the first motor 2 is transmitted to rear wheels 3 as drive wheels, an engagement state of the clutch mechanism 9 is controlled, that is, slip control is executed to continuously change the transmission torque capacity in the clutch mechanism 9, thereby perform smooth starting or power transmission. The clutch mechanism 9 may be, for example, a multi-plate clutch in which a plurality of friction plates is alternately arranged.

A rear differential gear set 11 is coupled to the automatic transmission 8 through a rear propeller shaft 10, and drive torque is transmitted from the rear differential gear set 11 to right and left rear wheels 3 as drive wheels.

A motor controller 12 is connected to the above-described first motor 2. The motor controller 12 includes the electric power storage device 13, such as a secondary battery, and the inverter 14, and is configured to charge the electric power storage device 13 with electric power generated by the first motor 2 and supply electric power from the electric power storage device 13 to the first motor 2.

An electronic control unit (ECU) 15 that controls the start and stop of the above-described engine 1, the engine torque output from the engine 1, the drive and stop or electric power generation of the first motor 2, a gear stage of the automatic transmission 8, the engagement and release of the clutch mechanism 9, and the like is provided. The ECU 15 is an example of a controller in the embodiment of the disclosure, and is primarily constituted of a microcomputer. The ECU 15 is configured to perform arithmetic operations using various kinds of data to be input and data stored in advance, and output results of the arithmetic operations as control command signals. Examples of the input data include an accelerator operation amount ACC as a depression amount of an accelerator pedal (not shown), a vehicle speed V, a state of charge (SOC) of the electric power storage device 13, an engine fluid temperature Twe, an engine rotation speed NE, the input shaft rotation speed NT of the input shaft 8a of the automatic transmission 8, and the like. As the control command signal, a control signal of an ignition timing of the engine 1, a control signal of the first motor 2, a control signal of the transmission torque capacity of the engagement or release of the clutch mechanism 9, a control signal of the gear stage of the automatic transmission 8, and the like are output from the ECU 15. The ECU 15 controls the above-described equipment, such as the engine 1, and thus, may be a control device in which an ECU for an engine or an ECU for a motor and an ECU for an automatic transmission are integrated or a high-order control device that outputs the command signals to the ECUs.

Figure 2:
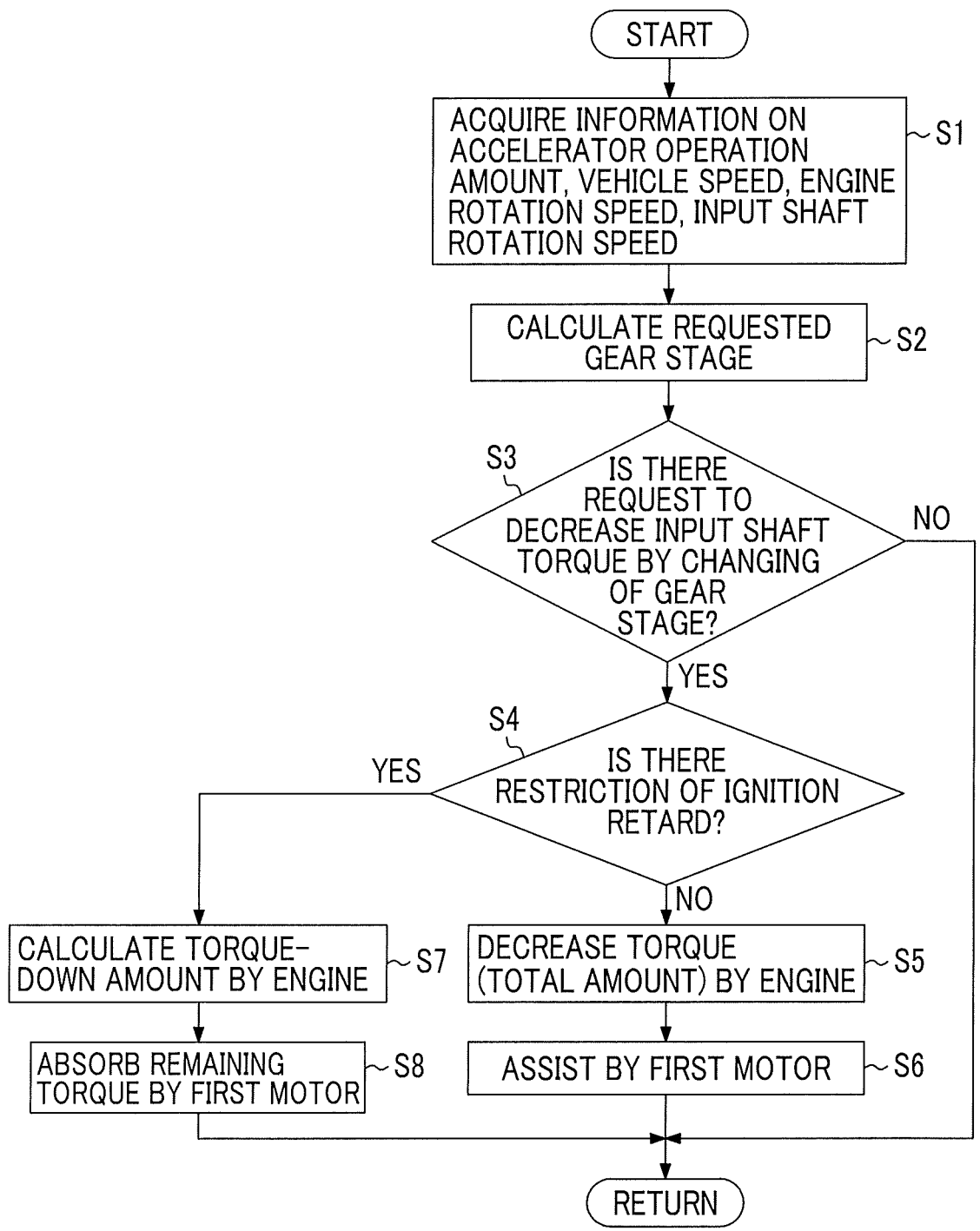
FIG. 2 is a flowchart illustrating a first control example that is executed by the control device for a vehicle according to the embodiment of the disclosure.

A control device according to the embodiment of the disclosure that is applied to the above-described hybrid vehicle Ve is configured to execute the following control in order to decrease the input shaft rotation speed NT of the automatic transmission 8 according to the state of the hybrid vehicle Ve with appropriate means and suppress gear shift shock in the upshift. FIG. 2 is a flowchart illustrating a first control example that is executed by the control device for a vehicle according to the embodiment of the disclosure. A routine shown in the drawing is repeatedly executed by the ECU 15 at each predetermined short time. First, various kinds of data to be used in control are read (Step S1). Data to be read are the accelerator operation amount ACC, the vehicle speed V, the engine rotation speed NE, the input shaft rotation speed NT of the transmission, and the like. A requested gear stage, that is, a target gear stage that is set in the automatic transmission 8 is calculated based on various kinds of data input to the ECU 15 (Step S2). For example, the target gear stage can be calculated based on the accelerator operation amount ACC and the vehicle speed V.

Next, in Step S3, determination is made whether or not a request to compare the target gear stage calculated in Step S2 with a current gear stage set at the current time and change the gear stage from the current gear stage to the target gear stage, that is, perform an upshift to decrease the input shaft rotation speed NT or input shaft torque of the automatic transmission 8 is issued. In a case where the accelerator operation amount ACC is large, that is, requested drive power is large, and a downshift is performed, or in a case where requested drive power is small, and the target gear stage based on the accelerator operation amount ACC and the vehicle speed V at the current time is the same as the current gear stage, the determination in Step S3 is negative, and the process is returned once without particularly executing control.

In a case where the determination in Step S3 is affirmative, the process progresses to Step S4. In Step S4, determination is made whether or not there are restrictions on the execution of the ignition retard. For example, in a case where the ignition retard of the engine 1 is executed, since combustion of fuel is performed on an exhaust stroke, high-temperature combustion exhaust gas is discharged to the exhaust duct 5, and the exhaust gas control catalyst 6 is heated by high-temperature combustion exhaust gas, compared to a case where the ignition retard is not executed. Accordingly, in a case where the temperature of the exhaust gas control catalyst 6 is high to some extent, and in a case where the ignition retard is executed, the exhaust gas control catalyst 6 may be damaged due to overheating. In Step S4, in order to avoid damage to the exhaust gas control catalyst 6 due to overheating, as an example, in a case where an integrated heat quantity of the exhaust gas control catalyst 6 is higher than an upper limit temperature for avoiding damage due to overheating, determination is made that there are the above-described restrictions. The integrated heat quantity can be calculated based on an integrated air quantity supplied to the engine 1 and a temperature of combustion exhaust gas.

In a case where the engine fluid temperature Twe is lower than a predetermined fluid temperature, as known in the related art, the ignition retard is executed, and in a case where the engine fluid temperature Twe becomes higher than the predetermined fluid temperature, the ignition timing is returned to a normal ignition timing. For this reason, in a case where the engine fluid temperature Twe is lower than the predetermined fluid temperature, and accordingly, warming-up of the engine 1 does not end, it is preferable continue the ignition retard, and in this case, determination can be made that there are no above-described restrictions. In a case where the engine fluid temperature Twe is higher than the predetermined fluid temperature, and accordingly, warming-up of the engine 1 ends, determination can be made that there are the above-described restrictions.

In addition, while autodiagnosis is performed based on an on board diagnostics [OBD] request for autodiagnosis of abnormality, failure, or the like of the engine 1, in order to suppress erroneous diagnosis, it is preferable that an operation state of the engine 1 is not changed for the purpose of decreasing the input shaft rotation speed NT accompanied by the upshift. Accordingly, even in a case where such an OBD request is issued, determination is made in Step S4 that there are the above-describe restrictions. In reducing the nitrogen oxide in combustion exhaust gas or in avoiding sulfur poisoning of exhaust gas control catalyst 6, the ignition retard is executed in order to supply hydrocarbon to the exhaust gas control catalyst 6. For this reason, even in a case where a request to reduce the nitrogen oxide in combustion exhaust gas or avoid sulfur poisoning of exhaust gas control catalyst 6 is issued, determination can be made that there are the above-described restrictions. Functional means for executing the control of Step S4 is an example of a prohibition condition in the embodiment of the disclosure.

That is, in Step S4, in a state in which there are no various restrictions in executing the ignition retard, determination is made whether or not the operation state of the engine 1 is changeable. In a case where the operation state of the engine 1 is changeable in a state in which there are no restrictions, the determination in Step S4 is negative, and the process progresses to Step S5.

In Step S5, the engine torque output from the engine 1 is decreased. The decrease in the engine torque is performed by the above-described ignition retard. For example, the engine torque is decreased by the ignition retard by an amount corresponding to the total amount of torque (hereinafter, simply referred to as a torque-down amount of the input shaft 8a of the input shaft 8a to be decreased accompanied by the upshift. Next, in Step S6, the first motor 2 is rotated in the same forward direction as the engine 1 to output positive torque, and the engine 1 is assisted by the first motor 2. This is to compensate for a friction loss at places frictionally engaged with each other at the time of change of the gear stage with the first motor 2 as an example. For this reason, in a case where a request to assist the torque of the input shaft 8a with the first motor 2 is not particularly issued, such as a case where the above-described loss is small or negligible, a so-called assistance amount of the first motor 2 in Step S6 is set to "0". Thereafter, the routine shown in FIG. 2 is returned once.

In contrast, in a case where there are the restrictions on the execution of the ignition retard, the determination in Step S4 is affirmative, and the process progresses to Step S7. In Step S7, in a state in which there are the above-described restrictions, the engine torque (hereinafter, referred to as a torque-down amount of the engine 1) that can be decreased as a result of execution of the ignition retard is calculated, and the ignition retard is executed by the calculated torque-down amount of the engine 1, whereby the engine torque is decreased. With this, the torque of the input shaft 8a is reduced by the torque-down amount of the engine 1. Specifically, even in a case where there are the restrictions on the execution of the ignition retard, in a case where the temperature of the exhaust gas control catalyst 6 does not reach the upper limit temperature, it is possible to decrease the engine torque by executing the ignition retard until the temperature of the exhaust gas control catalyst 6 reaches the upper limit temperature. In Step S7, even though the ignition retard is executed and the high-temperature combustion exhaust gas is supplied to the exhaust gas control catalyst 6, the ignition retard is executed and the torque of the engine 1 is decreased within a temperature range until the temperature of the exhaust gas control catalyst 6 reaches the upper limit temperature. An upper limit value may be set for the integrated air quantity to the exhaust gas control catalyst 6 or the heat quantity supplied to the exhaust gas control catalyst 6, in place of the upper limit temperature, and the ignition retard may be executed until the integrated air quantity or the heat quantity reaches the upper limit value. In a case where the temperature of the exhaust gas control catalyst 6 is equal to or higher than the upper limit temperature, in a case where the OBD request is issued, in a case where warming-up ends, or the like, the operation state of the engine 1 is not particularly changed, and thus, the engine torque is substantially maintained.

Next, the process progresses to Step S8, and the torque of the input shaft 8a is decreased by the first motor 2 by an amount corresponding to the remaining torque-down amount obtained by subtracting the torque-down amount of the engine 1 in Step S7 from the torque-down amount of the input shaft 8a. Specifically, the first motor 2 is subjected to regenerative control and outputs negative torque acting to decrease the torque of the input shaft 8a. With this, the input shaft rotation speed NT is decreased. As described above, in a case where the engine torque output from the engine 1 is substantially maintained, negative torque is output from the first motor 2 by an amount corresponding to the total torque-down amount of the input shaft 8a. In this way, in Step S8, the total torque-down amount of the input shaft 8a is substantially absorbed by the first motor 2, and accordingly, the input shaft rotation speed NT is decreased. Thereafter, the routine shown in FIG. 2 is returned once.

Figure 3:
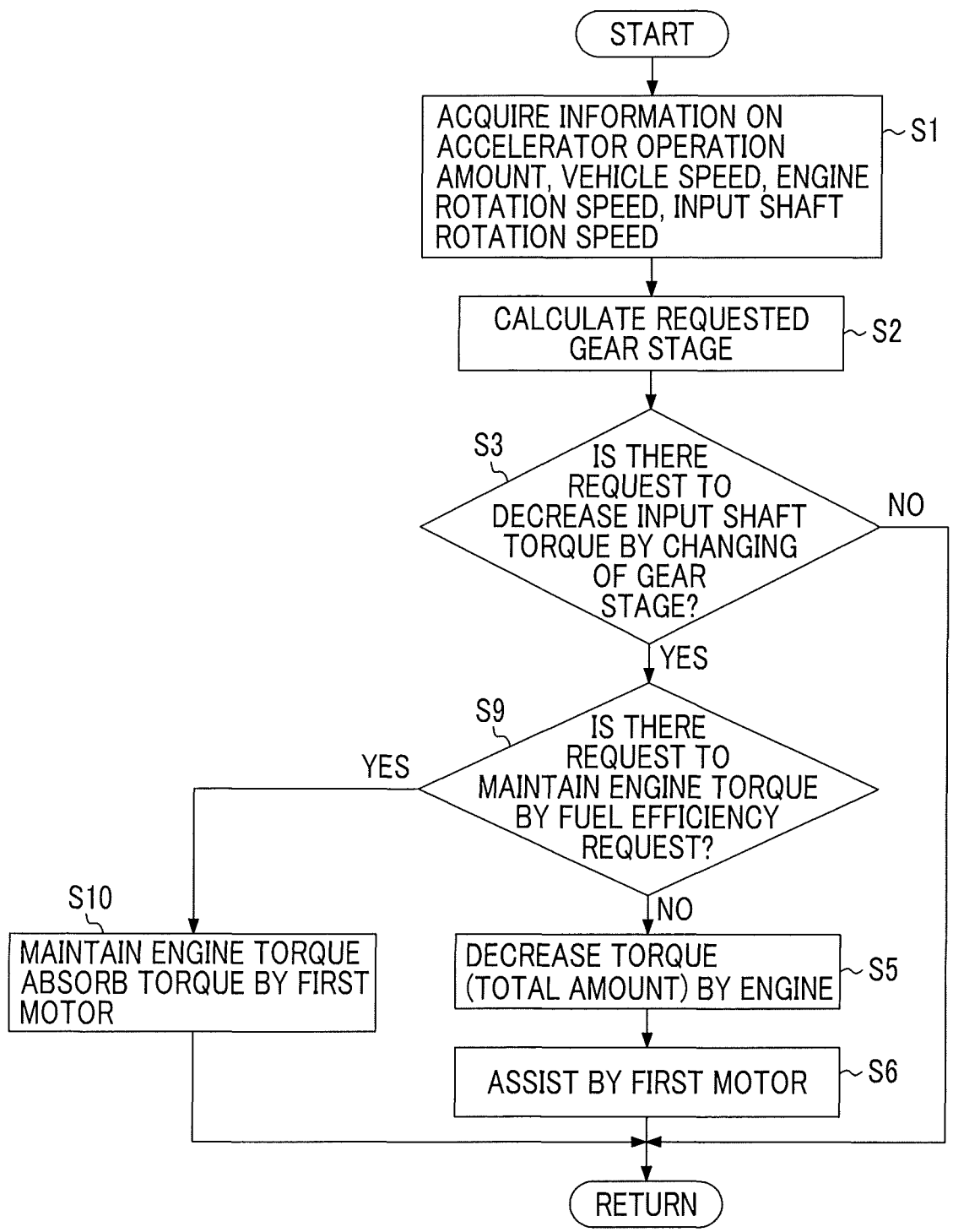
FIG. 3 is a flowchart illustrating a second control example that is executed by the control device for a vehicle according to the embodiment of the disclosure.

FIG. 3 is a flowchart illustrating a second control example that is executed by the control device for a vehicle according to the embodiment of the disclosure. In the flowchart of FIG. 3, the control steps having the same control contents as in the flowchart of FIG. 2 described above are represents the same step numbers as in the flowchart of FIG. 2.

In an example shown in FIG. 3, subsequent to Step S3, in a case where a request (hereinafter, referred to as a fuel efficiency request) to give priority to fuel efficiency is issued, determination is made whether or not a request to maintain the engine torque output from the engine 1 is issued (Step S9). A state in which the engine torque is maintained as a result of issuance of the fuel efficiency request can be referred to as, for example, a state in which the accelerator operation amount ACC is substantially constantly maintained to be a predetermined low operation amount or, a constant speed traveling state in which the accelerator operation amount ACC is the predetermined low operation amount and change in vehicle speed V is small, or the like. That is, in Step S9, substantially similarly to Step S4 described above, determination is made whether or not the operation state of the engine 1 is changeable in order to decrease the torque of the input shaft 8a. Functional means for executing the control of Step S9 is an example of the prohibition condition in the embodiment of the disclosure.

In a case where a request to maintain the engine torque is not issued as a result of non-issuance of the fuel efficiency request, and the operation state of the engine 1 is changeable, the determination in Step S9 is negative, and the process progresses to Step S5. Then, the ignition retard or fuel cut-off control for stopping supply of fuel to the engine 1 is executed to decrease the engine torque. Furthermore, the process progresses to Step S6, and the input shaft rotation speed NT is controlled to the input shaft rotation speed NT corresponding to the target gear stage by the first motor 2.

In contrast, in a case where the operation state of the engine 1 is not particularly changed as a result of issuance of the above-described request, the determination in Step S9 is negative, and the process progresses to Step S10. In Step S10, the first motor 2 is subjected to regenerative control and outputs the negative torque by an amount corresponding to the total torque-down amount of the input shaft 8a. That is, the total torque-down amount of the input shaft 8a is substantially absorbed by the first motor 2, and thus, the input shaft rotation speed NT is decreased. Thereafter, the routine shown in FIG. 3 is returned once.

Figure 4:
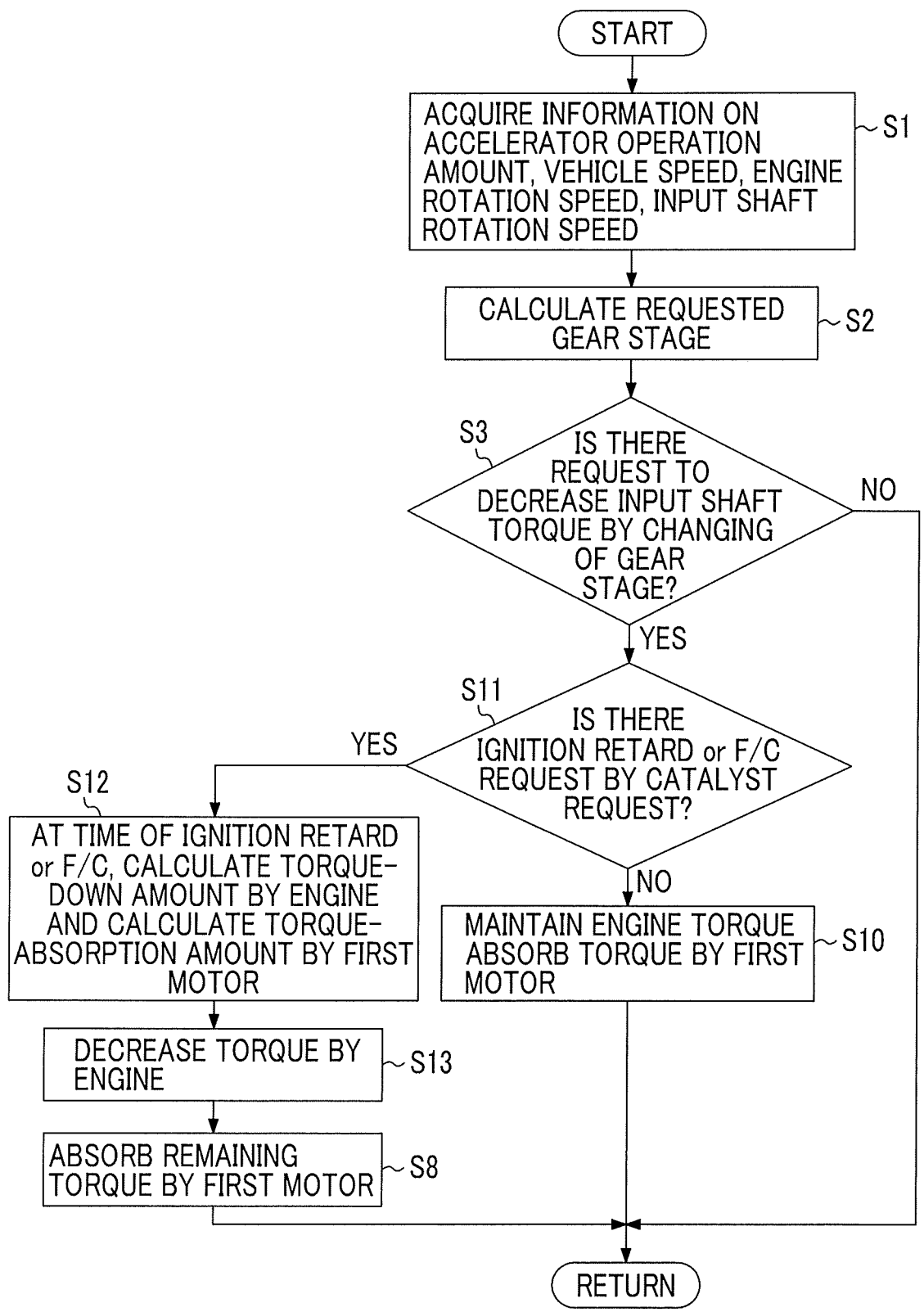
FIG. 4 is a flowchart illustrating a third control example that is executed by the control device for a vehicle according to the embodiment of the disclosure.

FIG. 4 is a flowchart illustrating a third control example that is executed by the control device for a vehicle according to the embodiment of the disclosure. In the flowchart of FIG. 4, the control steps having the same control contents as in the flowchart of FIG. 2 described above are represents the same step numbers as in the flowchart of FIG. 2.

In an example shown in FIG. 4, subsequent to Step S3, as a result of issuance of a request (hereinafter, referred to as a catalyst request) according to the state of the exhaust gas control catalyst 6, such as a request to warm up the exhaust gas control catalyst 6, a request to make the exhaust gas control catalyst 6 store oxygen, or the like, determination is made whether or not a request to execute the ignition retard or the fuel cut-off control is issued (Step S11). Specifically, as described above, in a case where the temperature of the exhaust gas control catalyst 6 is lower than the activation temperature, for example, the exhaust gas control catalyst 6 is warmed up through the ignition retard. The exhaust gas control catalyst 6 reduces the nitrogen oxide with hydrocarbon included in the combustion exhaust gas and oxygen stored in the exhaust gas control catalyst 6. For this reason, in a case where an oxygen storage amount is small, the fuel cut-off control for stopping supply of fuel to the engine 1 is executed to supply oxygen to the exhaust gas control catalyst 6 and to make the exhaust gas control catalyst 6 store oxygen. In Step S11, determination is made whether or not a request to execute the ignition retard or the fuel cut-off control is issued as a result of issuance of such a catalyst request. In other words, in Step S11, substantially similarly to Step S4 in the first control example and Step S9 in the second control example, determination is made whether or not the operation state of the engine 1 changeable. The temperature of the exhaust gas control catalyst 6 or the oxygen storage amount can be calculated based on an intake air amount of the engine 1 detected by an air flowmeter (not shown), an air-fuel ratio of the air-fuel mixture, or the like. Functional means for executing the control of Step S11 is an example of the prohibition condition in the embodiment of the disclosure.

In a case where the request to execute the ignition retard or the fuel cut-off control is not issued, the operation state of the engine 1 is not particularly changed. Thus, the engine torque is substantially maintained. In this case, the determination in Step S11 is negative, and the process progresses to Step S10. In contrast, in a case where the request to execute the ignition retard or the fuel cut-off control is issued, the operation state of the engine 1 is changed. Thus, the determination in Step S11 is affirmative, and the process progresses to Step S12.

In Step S12, the torque-down amount of the engine 1 as a result of execution of the ignition retard or the fuel cut-off control is calculated, and the torque-down amount of the input shaft 8a to be absorbed by the first motor out of the torque-down amount of the input shaft 8a is calculated. That is, an amount of regeneration in the first motor 2 is calculated. Next, the process progresses to Step S13, and the ignition retard or the fuel cut-off control is executed by the torque-down amount of the engine 1 calculated in Step S12, whereby the engine torque output from the engine 1 is decreased. Furthermore, the process progresses to Step S8, and the first motor 2 is subjected to regenerative control by the torque-down amount of the input shaft 8*a* absorbed by the first motor calculated in Step S12 to output negative torque. That is, the torque of the input shaft 8*a* is decreased by the first motor 2 by the amount corresponding to the remaining torque-down amount obtained by subtracting the torque-down amount of the engine 1 in Step S7 from the input shaft 8*a*.

Figure 5:
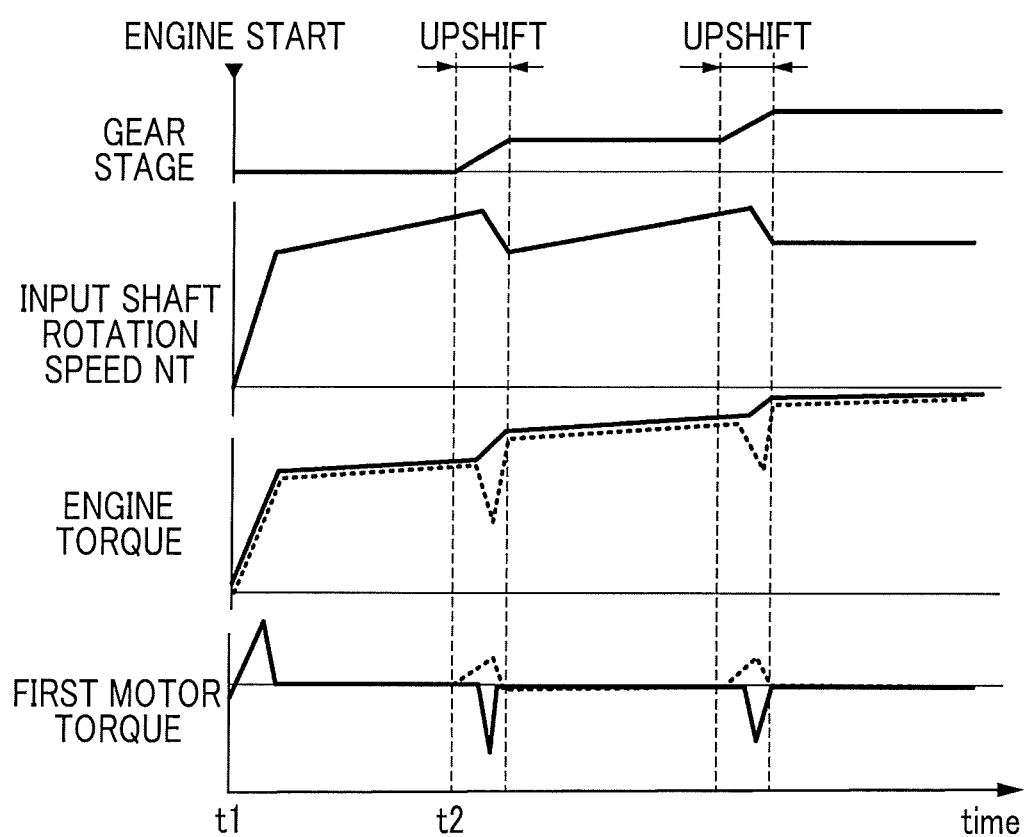
FIG. 5 is a time chart schematically showing changes in input rotation speed, engine torque, and torque output from a first motor in a case where any control example among the first control example to the third control example is executed.

The operations of the first control example to the third control example described above will be described. FIG. 5 shows changes in the input shaft rotation speed NT of the automatic transmission 8, that is, a rotation speed of the first motor 2, the engine torque output from the engine 1, and the first motor torque output from the first motor 2 in a case where the gear stage set in the automatic transmission 8 is upshifted. In a case where an accelerator pedal is depressed at predetermined time t1 in a state in which the vehicle is stopped, the engine 1 is cranked by the first motor 2. With this, the engine 1 is started, the rotation speed of the engine 1 gradually increases, and the rotation speed of the input shaft rotation speed NT of the automatic transmission 8 gradually increases. In a state in which the vehicle is stopped, the gear stage of the automatic transmission 8 is set to, for example, a first gear stage in which the gear ratio is the largest.

In a case where the vehicle speed V increases and crosses an upshift line on a gear shift map (not shown) at time t2, an upshift to make the gear ratio set in the automatic transmission 8 smaller is started. In this case, in a case where the operation state of the engine 1 is changeable, as described by a dotted line in FIG. 5, the ignition retard or the fuel cut-off control is executed, and the engine torque output from the engine 1 is decreased. In this case, in a case where there is the friction loss as described above, assistance is performed by the first motor 2, and the engine rotation speed, that is, the input shaft rotation speed NT of the automatic transmission 8 is controlled to the input shaft rotation speed NT corresponding to the target gear stage. A case where the operation state of the engine 1 is changeable is a case where the determination in Step S4 described above is negative, a case where the determination in Step S9 is negative, a case where the determination in Step S11 is affirmative, or the like.

In contrast, in a case where the operation state of the engine 1 is not particularly changed, as described by a solid line in FIG. 5, the engine torque output from the engine 1 is substantially maintained. The first motor 2 is subjected to regenerative control to output negative torque by the amount of decrease in the input shaft rotation speed NT, whereby the input shaft rotation speed NT is decreased. A case where the operation state of the engine 1 is not particularly changed is a case where the determination in Step S4 is affirmative, a case where the determination in Step S9 is affirmative, a case where the determination in Step S11 is negative, or the like, as described above.

Therefore, according to the first control example to the third control example described above, in a case where the input shaft rotation speed NT is decreased for the upshift, the input shaft rotation speed NT can be decreased primarily by the engine 1 or the input shaft rotation speed NT can be decreased primarily by the first motor 2 according to the state of the hybrid vehicle Ve. For this reason, in a case where the temperature of the exhaust gas control catalyst 6 is low in the upshift, it is possible to satisfactorily perform warming-up of the exhaust gas control catalyst 6, and to perform the upshift with decrease in the engine torque. In a case where the temperature of the exhaust gas control catalyst 6 is the upper limit temperature, the torque-down amount of the input shaft 8*a* in the upshift is absorbed by the first motor 2. For this reason, it is possible to execute the ignition retard or the fuel cut-off control to suppress deterioration of the exhaust gas control catalyst 6 due to overheating. That is, since the torque of the input shaft 8*a* is absorbed by the first motor 2, and decrease in the input shaft rotation speed NT is assisted by the first motor 2, it is possible to quickly perform the upshift compared to a case where the upshift is performed solely by the engine having an inevitable response lag. Furthermore, since the difference rotation speed between the input shaft 8*a* and the output shaft 8*b* of the automatic transmission 8 can be made as small as possible, it is possible to smoothly perform a gear shift.

Figure 6:
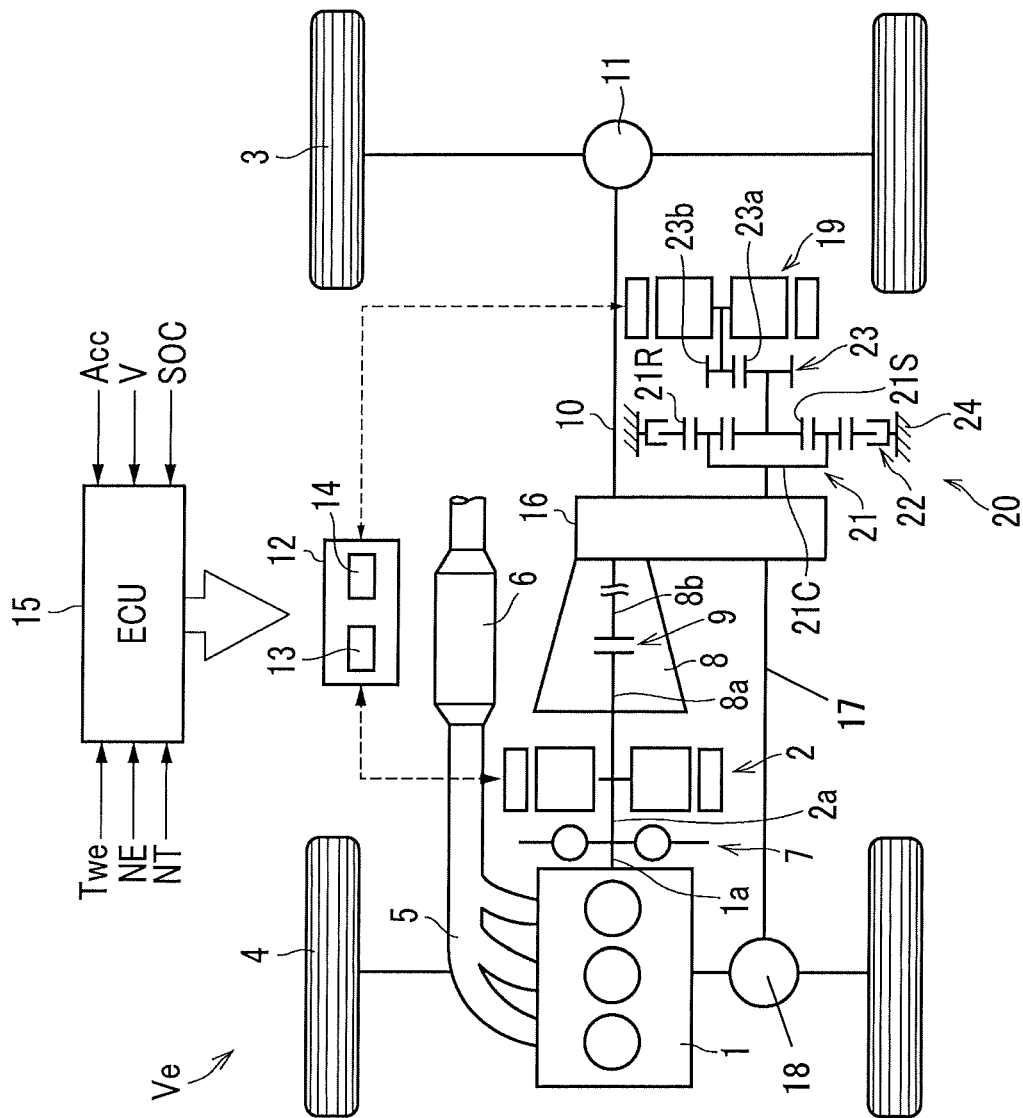
FIG. 6 is a diagram schematically showing a second example of a hybrid vehicle to which the control device for a vehicle according to the embodiment of the disclosure can be applied.

FIG. 6 is a diagram schematically showing a second example of a hybrid vehicle to which the control device for a vehicle according to the embodiment of the disclosure can be applied. The hybrid vehicle Ve shown in FIG. 6 is a four-wheel drive vehicle based on the FR type hybrid vehicle Ve shown in FIG. 1. The rear wheels 3 and the front wheels 4 are an example of drive wheels in the embodiment of the disclosure. A transfer 16 for four-wheel drive (for 4WD) is arranged on an output side of the automatic transmission 8. The transfer 16 is a mechanism that distributes the engine torque output from the engine 1 or the torque output from the automatic transmission 8 to the rear wheels 3 side and the front wheels 4 side. A rear propeller shaft 10 is coupled to a member (not shown) that outputs torque to the rear wheels 3 side, and a front propeller shaft 17 is coupled to a member (not shown) that outputs torque to the front wheels 4 side. A front differential gear set 18 is coupled to the front propeller shaft 17. Drive torque is transmitted from the front differential gear set 18 to the right and left front wheels 4.

The transfer 16 can be constituted of a winding power transmission mechanism using a chain or a belt or a gear mechanism. The transfer 16 can be constituted of a full-time four-wheel drive mechanism composed of a differential mechanism that enables differential rotation of the front wheels 4 and the rear wheels 3 or a differential mechanism including a differential limiting mechanism that limits the differential rotation by a friction clutch or the like, a part-time four-wheel drive mechanism that selectively cuts off transmission of torque to the front wheels 4 side, or the like.

A second motor (MG2) 19 is coupled to the above-described front propeller shaft 17. The second motor 19 outputs drive power for traveling and performs energy regeneration at the time of deceleration. For example, a motor having an electric power generation function, such as a permanent magnet type synchronous motor is employed. The second motor 19 may be coupled directly to the front propeller shaft 17. The second motor 19 and the front propeller shaft 17 may be coupled through a suitable power transmission mechanism 20.

In an example shown in FIG. 6, the second motor 19 and the front propeller shaft 17 are coupled through the power transmission mechanism 20, and in the example, the power transmission mechanism 20 has a planetary gear mechanism 21, an engagement mechanism 22, and a reduction gear pair 23. The planetary gear mechanism 21 is a single-pinion type planetary gear mechanism having, as rotating elements, a sun gear 21S, a ring gear 21R arranged on a concentric circle with respect to the sun gear 21S, and a carrier 21C that retains a pinion gear meshing with the sun gear 21S and the ring gear 21R. The planetary gear mechanism 21 is arranged on the same axis as the front propeller shaft 17 on a vehicle rear side of the front propeller shaft 17. The front propeller shaft 17 is coupled to the carrier 21C, and the engagement mechanism 22 is provided between the ring gear 21R and a predetermined fixing portion 24, such as a casing. The engagement mechanism 22 is a mechanism that is engaged to couple the ring gear 21R to the fixing portion 24 and to stop rotation of the ring gear 21R or is released to release fixing of the ring gear 21R. For the engagement mechanism 22, a mechanism, such as a meshing type clutch including a dog clutch or a frictional type clutch, can be used.

The functions of the above-described engagement mechanism 22 and the advantages of providing the engagement mechanism 22 will be described. In a case where the engagement mechanism 22 is engaged, the ring gear 21R is fixed, and the planetary gear mechanism 21 functions as a reduction mechanism. In a case where the engagement mechanism 22 is released, reaction force is not applied to the ring gear 21R, and a so-called neutral state in which the planetary gear mechanism 21 does not transmit torque is brought. Accordingly, in a case where the engagement mechanism 22 is released to separate the front propeller shaft 17 and the second motor 19 so as not to transmit torque, the second motor 19 is not rotated in traveling with the engine 1 as a drive power source. That is, even in a case where a maximum rotation speed of the second motor 19 is limited in structure, it is possible to restrain the rotation speed of the front propeller shaft 17 in a case where the vehicle travels at a high vehicle speed with the engine 1 as a drive power source, that is, the vehicle speed from being limited by the second motor 19.

The greater a reduction ratio by the reduction gear pair 23 and the planetary gear mechanism 21, the higher the rotation speed of the second motor 19 with respect to a predetermined vehicle speed. However, since the engagement mechanism 22 can be released to separate the second motor 19 from the front propeller shaft 17, the engagement mechanism 22 is released in a case where the second motor 19 is forcibly rotated with torque transmitted from the front propeller shaft 17 side, whereby it is possible to restrain the second motor 19 from being rotated at an excessively high rotation speed. In other words, the second motor 19 can be separated from the front propeller shaft 17 by the engagement mechanism 22, whereby it is possible to increase the reduction ratio by the reduction gear pair 23 or the planetary gear mechanism 21. With this, in a case where the vehicle travels with drive power of the second motor 19, for example, in a case where the vehicle starts with second motor torque output from the second motor 19, it is possible to increase drive power in the front wheels 4 to improve starting acceleration performance.

The reduction gear pair 23 is constituted of a driven gear 23a coupled to the sun gear 21S to be integrated with the sun gear 21S, and a drive gear 23b having a smaller diameter (a smaller number of teeth) than the driven gear 23a. Then, the second motor 19 is coupled to the drive gear 23b. Accordingly, in a case where the second motor 19 functions as a motor to output torque, the rotation speed of the driven gear 23a and the sun gear 21S integrated with the driven gear 23a becomes a rotation speed lower than the rotation speed of the second motor 19. In a case where the engagement mechanism 22 is engaged, and the ring gear 21R is fixed, the rotation speed of the carrier 21C to be an output element becomes a rotation speed lower than the rotation speed of the sun gear 21S to be an input element. Accordingly, the rotation speed of the front propeller shaft 17 coupled to the carrier 21C becomes a rotation speed lower than the rotation speed of the second motor 19. That is, the power transmission mechanism 20 becomes a reduction mechanism as a whole.

In the configuration shown in FIG. 6, the second motor 19 is coupled to an end portion on a rear side of the front propeller shaft 17 in a front-rear direction of the vehicle body. More specifically, the second motor 19 is arranged at a place not interfering with the transmission 8 or the transfer 16 on a rear side from the automatic transmission 8 or the transfer 16. In other words, the second motor 19 or the power transmission mechanism 20 is arranged effectively using a space under the floor in an existing four-wheel drive vehicle. Furthermore, since the second motor 19 is coupled to the front propeller shaft 17 through the power transmission mechanism 20 front propeller shaft 17 functioning as a reduction unit, the torque of the second motor 19 is amplified by the power transmission mechanism 20 and is transmitted to the front propeller shaft 17. For this reason, a low torque and high rotation type can be employed as the second motor 19, and in this way, the second motor 19 is reduced in size and mountability on the vehicle body is more improved.

Figure 7:
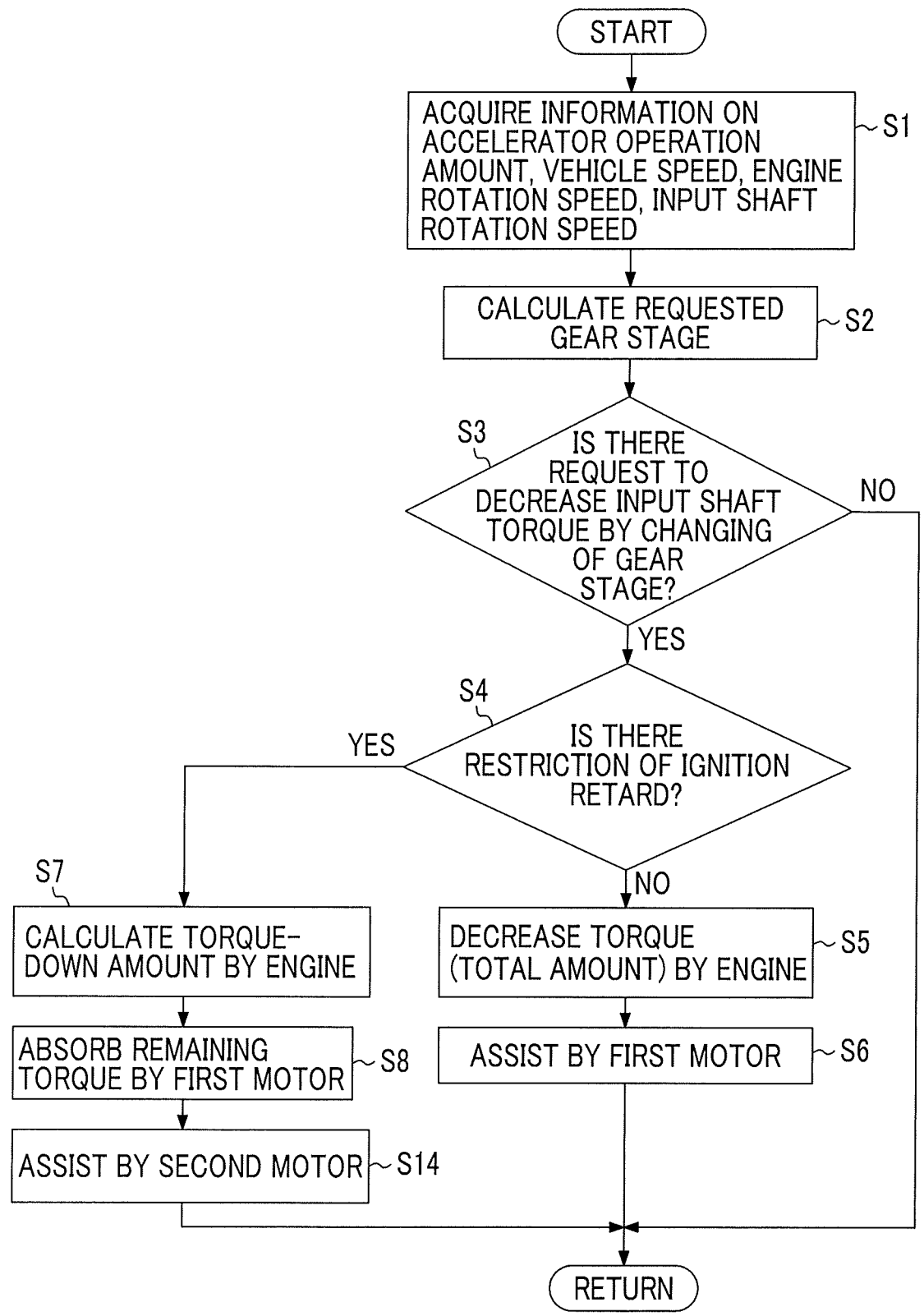
FIG. 7 is a flowchart illustrating a fourth control example that is executed by the control device for a vehicle according to the embodiment of the disclosure.

FIG. 7 is a flowchart illustrating a fourth control example that is executed by the control device for a vehicle according to the embodiment of the disclosure that is applied to the hybrid vehicle Ve having the configuration shown in FIG. 6. In the flowchart of FIG. 7, the control steps having the same control contents as in the flowchart of FIG. 2 described above are represents the same step numbers as in the flowchart of FIG. 2.

In an example shown in FIG. 7, subsequent to Step S8, electric power generated by the first motor 2 is supplied to the second motor 19 and consumed (Step S14). Since electric power generated by the first motor 2 is not supplied to the electric power storage device 13, the state of charge SOC of the electric power storage device 13 is not particularly increased. In particular, in a case where charging to the electric power storage device 13 is limited, or the like because the state of charge SOC of the electric power storage device 13 is high, the temperature of the electric power storage device 13 is low, or the like, it is possible to suppress overcharging of the electric power storage device 13. In a case where charging is not limited because the state of charge SOC of the electric power storage device 13 is low to some extent, and the temperature of the electric power storage device 13 is high to some extent, electric power generated by the first motor 2 may be supplied to the electric power storage device 13 to charge the electric power storage device 13.

Figure 8:
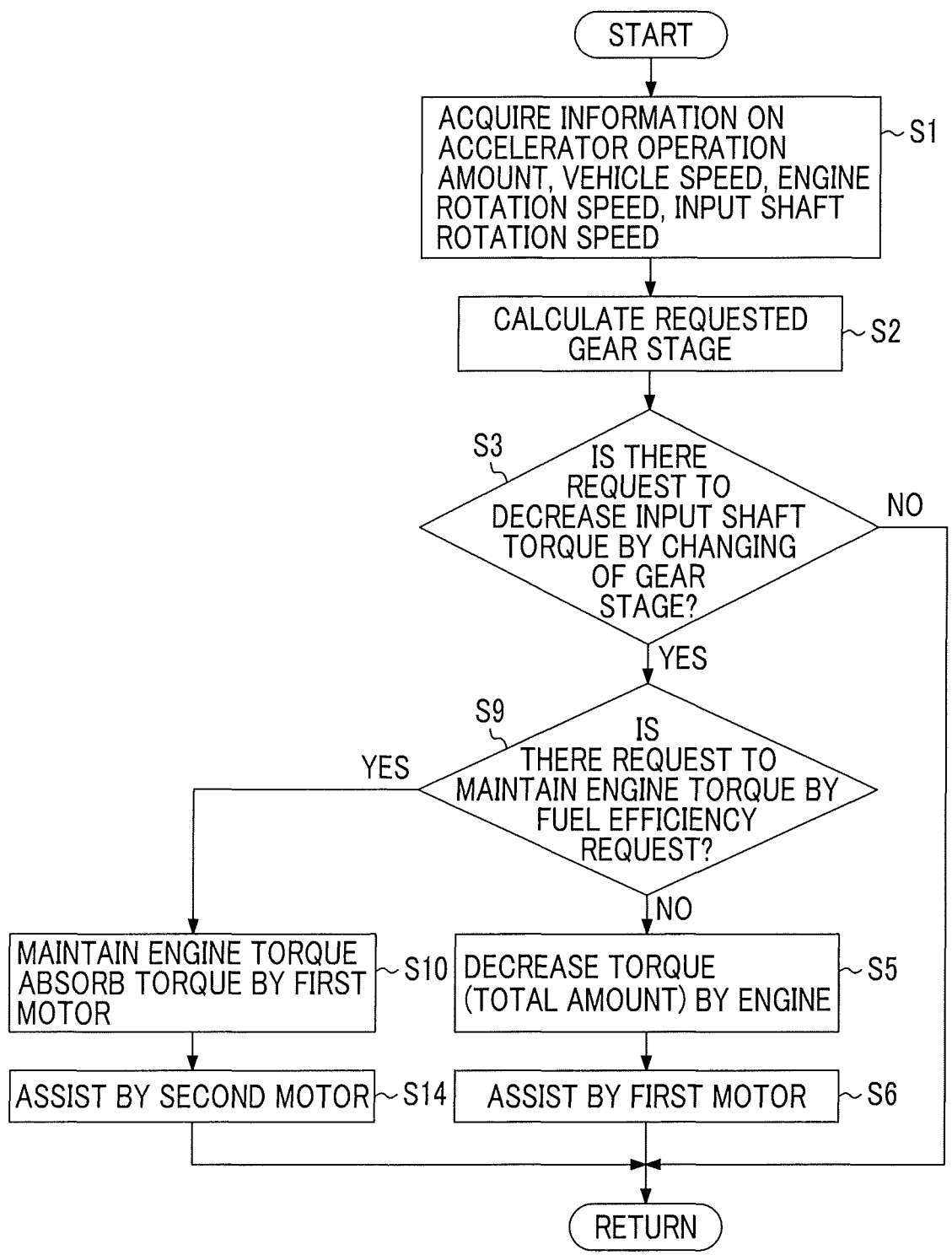
FIG. 8 is a flowchart illustrating a fifth control example that is executed by the control device for a vehicle according to the embodiment of the disclosure.
Figure 9:
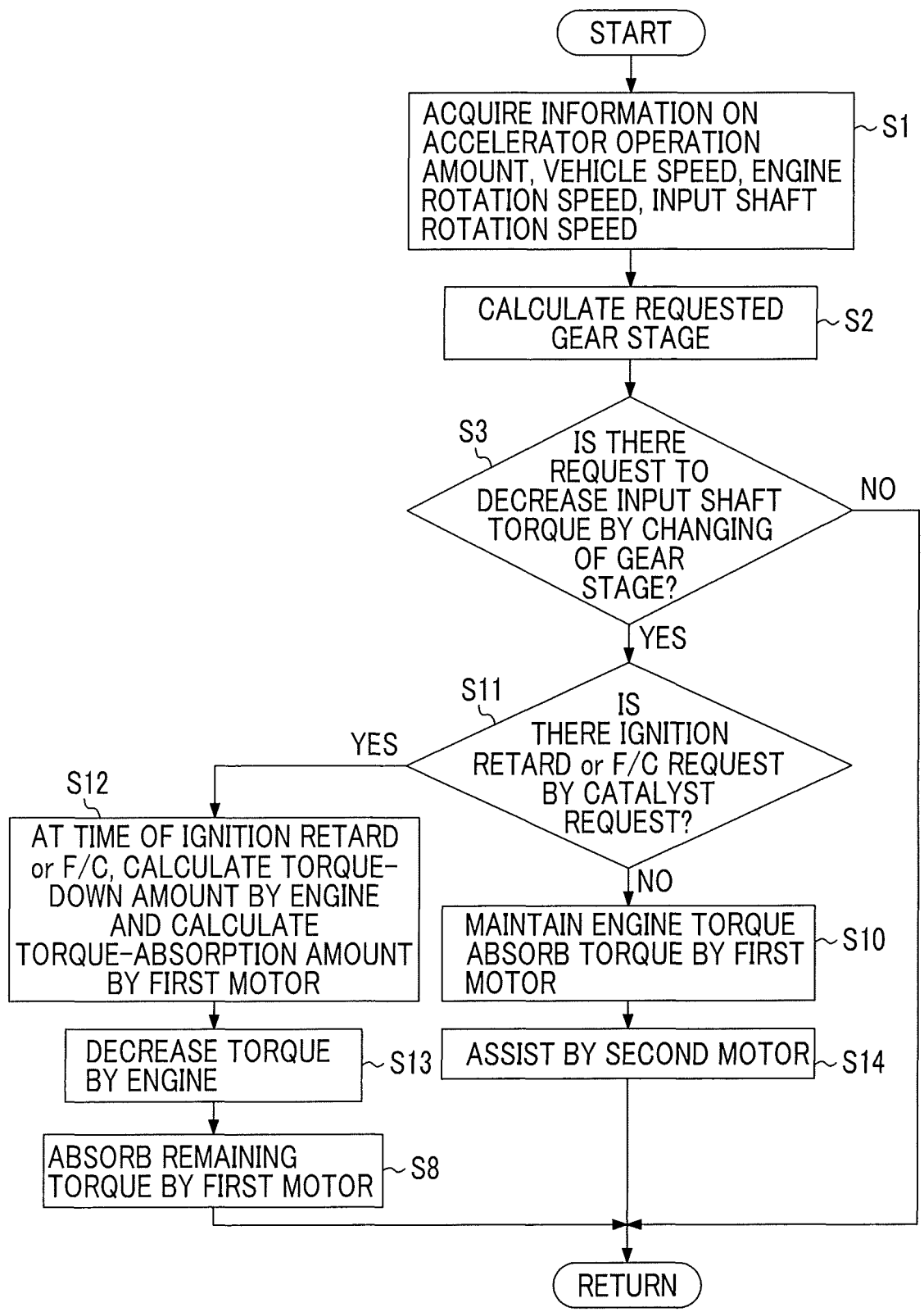
FIG. 9 is a flowchart illustrating a sixth control example that is executed by the control device for a vehicle according to the embodiment of the disclosure.

FIG. 8 is a flowchart illustrating a fifth control example that is executed by the control device for a vehicle according to the embodiment of the disclosure that is applied to the hybrid vehicle Ve having the configuration shown in FIG. 6, and FIG. 9 is a flowchart illustrating a sixth control example that is executed by the control device for a vehicle according to the embodiment of the disclosure that is applied to the hybrid vehicle Ve having the configuration shown in FIG. 6. In the flowcharts of FIGS. 8 and 9, the control steps having the same control contents as in the flowchart of FIG. 2 described above are represents the same step numbers as in the flowchart of FIG. 2.

In an example shown in FIG. 8, the process progresses to Step S14 subsequent to Step S10, and as described above, electric power generated by the first motor 2 is supplied to the second motor 19 and consumed. Even in an example shown in FIG. 9, similarly to the fifth control example shown in FIG. 8, the process progresses to Step S14 subsequent to Step S10. Accordingly, even in the examples shown in FIGS. 8 and 9, similarly to the example shown in FIG. 7, since electric power generated by the first motor 2 is consumed in the second motor 19, it is possible to obtain the same functional effects as in the fourth control example shown in FIG. 7. In a case where charging is not limited because the state of charge SOC of the electric power storage device 13 is low to some extent, and the temperature of the electric power storage device 13 is high to some extent, electric power generated by the first motor 2 may be supplied to the electric power storage device 13 to charge the electric power storage device 13.

Figure 10:
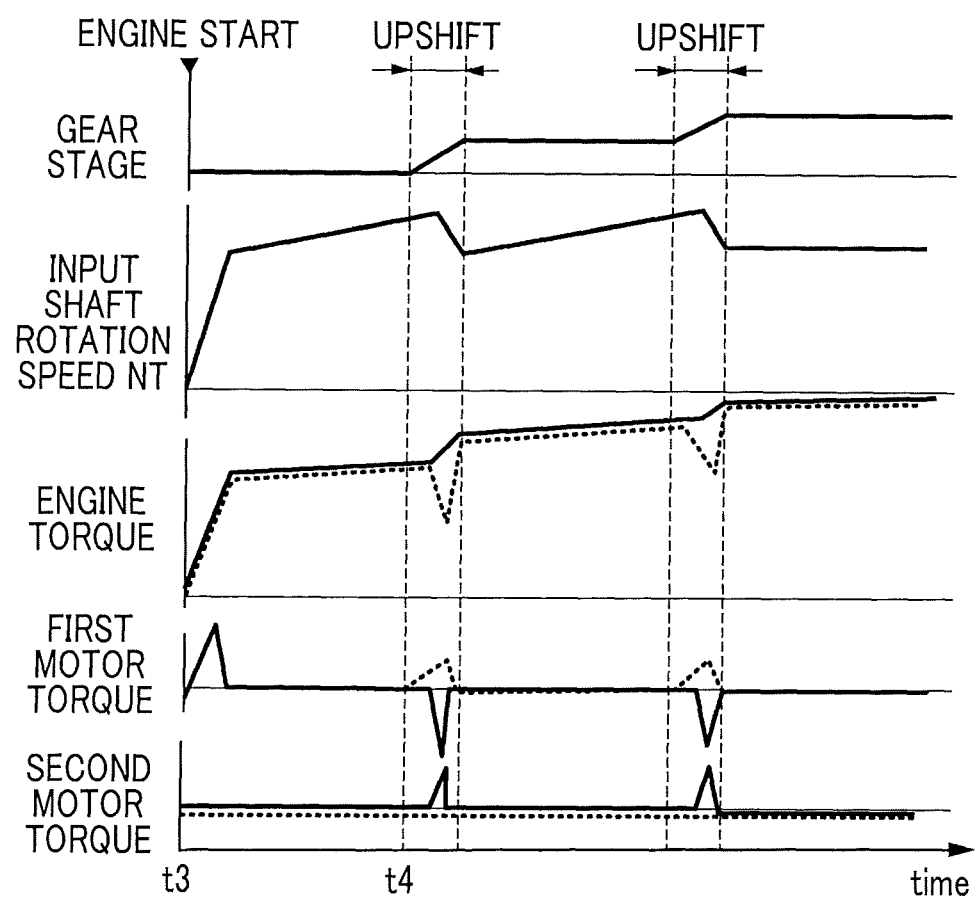
FIG. 10 is a time chart schematically showing changes in input rotation speed, engine torque, torque output from the first motor, and torque output from a second motor in a case where any control example among the fourth control example to the sixth control example is executed.

FIG. 10 shows changes in the input shaft rotation speed NT of the automatic transmission 8, that is, the rotation speed of the first motor 2, the engine torque output from the engine 1, the first motor torque output from the first motor 2, the second motor torque output from the second motor 19 in a case where the gear stage set in the automatic transmission 8 is upshifted, and in a case where the fourth control example to the sixth control example are executed. In a case where the accelerator pedal is depressed at predetermined time t3 in a state in which the vehicle is stopped, the engine 1 is cranked by the first motor 2. With this, the engine 1 is started, the rotation speed NE of the engine 1 gradually increases, and the rotation speed of the input shaft rotation speed NT of the automatic transmission 8 gradually increases. In a state in which the vehicle is stopped, the gear stage of the automatic transmission 8 is set to the first gear stage in which the gear ratio is the largest.

In a case where the vehicle speed V increases and crosses an upshift line on the gear shift map (not shown) at time t4, an upshift to make the gear ratio set in the automatic transmission 8 smaller is started. In this case, in a case where the operation state of the engine 1 is changeable, as described by a dotted line in FIG. 10, the ignition retard or the fuel cut-off control is executed, and the engine torque output from the engine 1 is decreased. In this case, the engine rotation speed, that is, the input shaft rotation speed NT of the automatic transmission 8 is controlled to the input shaft rotation speed NT corresponding to the target gear stage by the first motor 2. A case where the operation state of the engine 1 is changeable is a case where the determination in Step S4 described above is negative, a case where the determination in Step S9 is negative, a case where the determination in Step S11 is affirmative, or the like.

In contrast, in a case where the operation state of the engine 1 is not particularly changed, as described by a solid line in FIG. 10, the engine torque output from the engine 1 is substantially maintained. The first motor 2 is subjected to regenerative control to output negative torque by the amount of decrease in the input shaft rotation speed NT, whereby the input shaft rotation speed NT is decreased. The second motor 19 is driven with electric power generated by the first motor 2, and the electric power is consumed. A case where the operation state of the engine 1 is not particularly changed is a case where the determination in Step S4 is affirmative, a case where the determination in Step S9 is affirmative, a case where the determination in Step S11 is negative, or the like, as described above.

Therefore, according to the fourth control example to the sixth control example described above, in addition to obtaining the same functional effects as in the first control example to the third control example described above, the second motor 19 is driven with electric power generated by the first motor 2, and the electric power is consumed. For this reason, in a case where charging to the electric power storage device 13 is limited, or the like since the state of charge SOC of the electric power storage device 13 is high, a case where the temperature of the electric power storage device 13 is low, or the like, it is possible to suppress overcharging of the electric power storage device 13.

What is claimed is:

1. A control device for a hybrid vehicle, the hybrid vehicle including an engine, an exhaust gas control catalyst configured to remove combustion exhaust gas discharged from the engine, an automatic transmission arranged on an output side of the engine, and a first motor configured to have an electric power generation function of increasing or decreasing torque input from the engine to the automatic transmission, the control device comprising:
    a controller configured to control the engine, the first motor, and the automatic transmission, the controller being configured to,
    determine whether or not an operation state of the engine is changeable when an upshift of the hybrid vehicle to set a gear ratio smaller than a gear ratio currently set in the automatic transmission is performed,
    decrease torque of an input shaft of the automatic transmission to be decreased accompanied by the upshift by outputting negative torque acting to decrease the torque of the input shaft of the automatic transmission from the first motor, when a prohibition condition that the operation state of the engine is not changeable is established, and
    decrease engine torque output from the engine to decrease the torque of the input shaft of the automatic transmission to be decreased accompanied by the upshift when the prohibition condition is not established and the operation state of the engine is changeable.

2. The control device according to claim 1, wherein the prohibition condition is at least one of a condition that a request for autodiagnosis of the engine is issued, a condition that the exhaust gas control catalyst is not in a predetermined state, or a condition that a request to maintain the engine torque is issued.

3. The control device according to claim 2, wherein:
    the exhaust gas control catalyst is a three-way exhaust gas control catalyst configured to have an ability to store oxygen; and
    the predetermined state of the exhaust gas control catalyst is at least one of a state in which a temperature of the exhaust gas control catalyst is lower than a predetermined upper limit temperature, a state in which a request to retard an ignition timing of the engine is issued, or a state in which and a state in which a request to stop supply of fuel to the engine is issued.

4. The control device according to claim 1, wherein changing of the operation state of the engine is performed by at least one of retarding an ignition timing of the engine or stopping supply of fuel to the engine.

5. The control device according to claim 1, wherein:
    the hybrid vehicle further includes a first drive wheel to which torque is transmitted from the engine, a second drive wheel to which torque is not transmitted to the engine, and a second motor coupled to the second drive wheel to transmit torque and configured to have an electric power generation function; and
    the controller is configured to output the negative torque from the first motor to supply generated electric power to the second motor and to drive the second motor such that the second motor consumes the generated electric power, when the prohibition condition that the operation state of the engine is not changeable is established and the negative torque is output from the first motor to decrease the torque of the input shaft of the automatic transmission for the upshift.

6. A control method for a hybrid vehicle, the hybrid vehicle including an engine, an exhaust gas control catalyst configured to remove combustion exhaust gas discharged from the engine, an automatic transmission arranged on an output side of the engine, and a first motor configured to have an electric power generation function of increasing or decreasing torque input from the engine to the automatic transmission, the control method comprising:
- determining whether or not an operation state of the engine is changeable when an upshift of the hybrid vehicle to set a gear ratio smaller than a gear ratio currently set in the automatic transmission is performed;
- decreasing torque of an input shaft of the automatic transmission to be decreased accompanied by the upshift by outputting negative torque acting to decrease the torque of the input shaft of the automatic transmission from the first motor, when a prohibition condition that the operation state of the engine is not changeable is established; and
- decreasing engine torque output from the engine to decrease the torque of the input shaft of the automatic transmission to be decreased accompanied by the upshift when the prohibition condition is not established and the operation state of the engine is changeable.

7. The control method according to claim 6, wherein the prohibition condition is at least one of a condition that a request for autodiagnosis of the engine is issued, a condition that the exhaust gas control catalyst is not in a predetermined state, or a condition that a request to maintain the engine torque is issued.

* * * * *